United States Patent [19]
Boothe et al.

[11] 3,868,328
[45] Feb. 25, 1975

[54] FRICTION REDUCING COMPOUNDS FOR USE IN HYDRAULIC FRACTURING FLUIDS

[75] Inventors: Jerry Emile Boothe, Pittsburgh; Fred David Martin; Andrew Jackson Sharpe, Jr., both of McMurray, all of Pa.

[73] Assignee: Calgon Corporation, Robinson Township, Pa.

[22] Filed: Jan. 15, 1973

[21] Appl. No.: 323,546

Related U.S. Application Data

[63] Continuation-in-part of Ser. No. 233,345, March 9, 1972, abandoned.

[52] U.S. Cl................ 252/8.55 C, 137/13, 166/308, 252/8.55 D, 252/8.5 C, 260/89.7 N, 260/80.3 N
[51] Int. Cl.............................................. C09k 3/00
[58] Field of Search....... 252/8.55 C, 8.55 D, 8.5 C; 166/308; 137/13; 260/89.7 N, 80.3 N

[56] References Cited
UNITED STATES PATENTS

| | | | |
|---|---|---|---|
| 2,884,057 | 4/1959 | Wilson et al. | 260/89.7 |
| 2,980,657 | 4/1961 | Melamed | 260/80.3 |
| 3,254,719 | 6/1966 | Root | 166/308 |
| 3,520,313 | 7/1970 | Seymour | 137/13 |
| 3,562,226 | 2/1971 | Gayley et al. | 252/8.55 X |
| 3,572,354 | 3/1971 | Tinsley | 252/8.55 X |
| 3,666,810 | 5/1972 | Hoke | 260/80.3 X |

*Primary Examiner*—Benjamin R. Padgett
*Assistant Examiner*—B. Hunt
*Attorney, Agent, or Firm*—Martin L. Katz; Harry E. Westlake

[57] ABSTRACT

Polymers containing (3-acrylamido-3-methyl) butyl trimethyl ammonium chloride and/or certain related compounds are useful as friction reducers for aqueous fluids flowing through a conduit, especially for the aqueous hydraulic fracturing of subterranean formations, with or without the use of acid.

3 Claims, No Drawings

FRICTION REDUCING COMPOUNDS FOR USE IN HYDRAULIC FRACTURING FLUIDS

BACKGROUND OF THE INVENTION

This application is a continuation-in-part of an earlier filed application, Ser. No. 233,345, now abandoned, filed Mar. 9, 1972.

This invention is directed to the art of reducing the energy loss during the flow of aqueous fluids through pipes which by common usage in the oil field terminology has become known as "friction reduction." More particularly, our invention is directed to friction reduction in the aqueous hydraulic fracturing of subterranean formations. The aqueous fracturing fluid may be brine, fresh water, or acid. Our invention will also be useful in firefighting, hydraulic control systems, and in any other application where the energy loss of aqueous fluids flowing through a conduit is to be avoided.

It is well known that in the movement of aqueous fluids through conduits, friction is generated and hence energy is lost. This energy loss is apparent from the pressure drop entailed in moving the fluid through a given distance and is directly proportional to the velocity of the fluid. According to the well-known laws of fluid dynamics, as long as the critical Reynolds Number of a fluid medium flowing through a conduit is not exceeded, the fluid moves in laminae which are actually aligned along the conduit. Under these conditions of laminar flow, the energy loss is minimal. However, when the velocity is greatly increased, the critical Reynolds Number is exceeded and turbulence occurs. This turbulence represents the change from laminar to nonlaminar flow. In addition, turbulence is increased by any irregularities in the conduit or in fracturing a subterranean formation by entering the formation. An increase in turbulence causes an increase in the amount of energy lost through friction.

In the art of producing oil or gas from a subterranean formation, it is well known that production can be greatly increased by hydraulically fracturing the formation. In a hydraulic fracturing operation, a fracturing fluid is forced down a well bore under high pressures to fracture the rock formation surrounding the well bore. The pressure is then released allowing the oil or gas to seep through the fractures into the well bore where it is then pumped to the surface.

In the hydraulic fracturing operation, a high velocity is required and extremely high pressure drops are encountered resulting in large losses of energy. In hydraulic fracturing, it is necessary to inject sufficient amounts of fracturing fluids to build up the required pressure in the well in order to effectuate cracks or fractures in the subterranean formation. Pressures as high as 3,000 to 10,000 psi measured at the surface are often required. Because of the large quantities of fluid needed, the high velocities required, and the general irregularities of the formation, it is difficult to obtain satisfactory results in many fracturing operations because of the energy loss. Thus, a method of reducing this friction (energy) loss is greatly desirable.

It is, therefore, the principal object of this invention to provide a polymeric additive which reduces the friction loss in flowing aqueous fluids, especially as applied in the hydraulic fracturing of subterranean formations.

Most commonly, fresh water or aqueous brine are used as the fracturing medium in oil field operations. The brines usually contain from a few parts per million to high percentages of dissolved salts. In fact, oil field brines sometimes contain total dissolved solids of up to about 10 percent or higher. Particularly, common brines which are difficult to use with polymeric additives are those having dissolved alkaline earth metal salt concentrations of more than 1,000 ppm. Most oil field brines contain at least several hundred ppm of calcium in addition to 2 percent or more sodium chloride and potassium chloride.

In addition, it is also well known in the art of producing oil or gas from a subterranean formation that fluid production can occasionally be stimulated by injecting acid solutions into the formation by way of the well bore. This is especially true when the reservoir contains large amounts of carbonate rock such as limestone, dolomite, and the like. The acid reacts with the carbonate content of the rock, thereby creating channels in the rock between the reservoir and the well bore. This increases the effective drainage area of the well bore, stimulating production.

The most commonly used acid for this purpose is hydrochloric. However, other acids such as hydrofluoric, nitric, formic, acetic and sulfonic have also been highly successful in increasing production in calcareous formations. Mixtures of two or more different acids have also been used, especially mixtures containing hydrofluoric acid. The acids are usually employed as 1 percent to 35 percent by weight solutions in water. However, because of the scarcity of fresh water and economics, it is often necessary to employ oil field brine as the aqueous medium in place of water. In these cases, the aqueous medium will be an acidic brine.

Acidizing and hydraulic fracturing are generally combined into one treatment by employing an acidic fluid under hydraulic fracturing pressures. This combination treatment of the well is called acid fracturing and it stimulates production by obtaining the benefits of both the chemically created channels and the pressure created fractures. When acid fracturing, the aqueous fluid may be an acid solution or an acidic brine as described above.

It has become the common practice in the oil field art to add friction-reducing polymers to the fracturing fluids to reduce turbulence and subsequent energy loss as the fracturing fluid is forced from the surface into the subterranean formation. For example, see U. S. Pat. No. 3,023,760 which discloses the use of sodium polystyrene sulfonate as a friction reducer and U.S. Pat. Nos. 3,102,548, 3,254,719 and 3,370,650 which disclose the use of polyacrylamides as friction reducers. In addition, see U.S. Pat. Nos. 3,451,480 and 3,537,525 which disclose the use of polymers containing diacetone acrylamide as friction reducers. Finally, see U.S. Pat. No. 3,562,226 which discloses the use of polymers containing dialkyl diallyl quaternary ammonium groups as friction reducers.

While most of these above-mentioned friction reducers are effective and have been somewhat of a success, many of them suffer from one or more drawbacks. For example, some of the polymers have a tendency to precipitate in the presence of the highly concentrated dissolved inorganic salts. Some of the polymers are relatively unstable at the elevated temperatures found in most subterranean formations. In addition, the viscosities of many of the polymers are greatly decreased in the presence of brine or acid. It has been known for years that partially hydrolyzed polyacrylamide, when dissolved in pure water, forms a much more viscous solution than the unhydrolyzed polyacrylamides. However, most of this viscosity increase is lost in water containing high concentrations of dissolved inorganic salts and/or acids. This loss of viscosity seriously affects the friction-reducing properties of the polymer. Also, many of these prior art polymers are not shear stable, especially in the presence of dissolved inorganic salts and/or acids. Because of the extremely high velocities, it is important that the polymers be shear stable. Finally, many of the polymers are not as effective as desired and new and improved friction-reducing additives are always desirable. Moreover, none of the prior art compounds are effective in all of the different aqueous fracturing systems.

It is, therefore, an object of this invention to provide an improved friction reducer. It is a further object of this invention to provide a friction reducer that overcomes the defects of the prior art compounds.

SUMMARY OF THE INVENTION

We have found a series of polymeric friction reducers which are an improvement over the prior art compounds. The friction reducers of our invention are effective in fresh water, brines, and acidic fracturing fluids. In addition, they are temperature stable and shear stable. Finally, they are very effective at low concentrations. This combination of properties fulfills a long felt need by the art. The polymers of our invention are random, linear (including lightly crosslinked), high molecular weight water-soluble polymers containing at least 1.0 percent by weight of (3-acrylamido-3-methyl) butyl trimethyl ammonium chloride (AMBTAC) and/or its analogs. Such monomers are represented by the structural formula

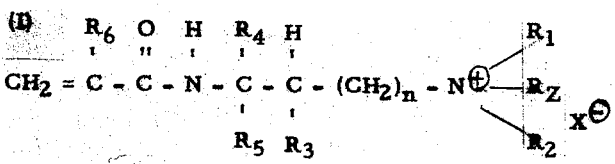

in which "$R_1$" and "$R_2$" are independently selected from linear and branched alkyl groups having up to 18 carbon atoms, aralkyl groups having up to 10 carbon atoms; "$R_3$" is a member selected from the group consisting of hydrogen, lower alkyl groups of 1 to 4 carbon atoms and halogen; "$R_4$" is a member selected from the group consisting of hydrogen, halogen, a linear or branched alkyl group of up to 5 carbon atoms; "$R_5$" is phenyl, lower alkyl (1 to 4 carbon atoms) substituted phenyl, wherein the substituents may be lower (1 to 4 carbon atoms) alkyls, lower alkoxy (1 to 4 carbon atoms); "$R_6$" is selected from hydrogen and methyl; "$R_z$" is $C_{1-16}$ aralkyl, $C_{1-16}$ alkyl, benzyl, phenethyl, cyanoethyl, or $-CH_2CH_2OH$; "X" is a salt-forming anion; and "$n$" is an integer from 0 to 2.

The cationic monomers useful in this invention can be prepared by the reaction of an unsaturated nitrile with an amino-containing compound that is capable of generating a carbonium ion in acidic media. Exemplary of suitable amino-containing reactive compounds are tertiary amino alcohols, acetates such as 3-hydroxy-3-methyl-1-butyl dimethyl amine, 3-acetoxy-3-methyl-1-butyl dimethyl amine, 2-hydroxy-2-methyl-1-propyl dimethyl amine and 2-acetoxy-2methyl-1-propyl dimethyl amine; unsaturated amines of the formula

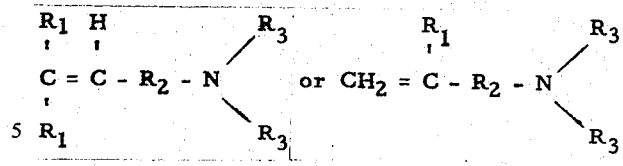

wherein "$R_1$" is alkyl, "$R_2$" is alkylene and "$R_3$" is alkyl. Exemplary of these unsaturated amines are methallyl dimethyl amine and 3-methyl-2-butenyl dimethyl amine; amino substituted benzyl alcohols or acetates such as 3,3-phenyl hydroxy-1-propyl dimethyl amine or 3,3-phenyl acetoxy-1-propyl dimethyl amine; and amino substituted styrenes such as 3-phenyl-3-propenyl dimethyl amine.

The above-mentioned amino-containing compounds will produce either tertiary carbonium ions or stabilized carbonium ions in the presence of a strong acid catalyst by the loss of a hydroxyl or acetoxy group or by the protonation of a double bond. Such compounds in the presence of strong acid react with unsaturated nitriles in a Ritter reaction to form N(amino alkyl) acrylamides. Accordingly, it would be obvious to those skilled in the art that the structural units separating the carbonium ion-forming site and the amino group can be varied over a wide range of substituents. Similarly, the substitutions on the amino function can be widely varied provided that the resulting reactive intermediate is a tertiary amine.

The unsaturated nitriles that are useful in the preparation of the polymers of this invention are acrylonitrile and methacrylonitrile. The resulting Ritter reaction products are the corresponding N(dialkyl amino alkyl) acrylamides and N(diallyl amino alkyl) methacrylamides.

The quaternary nitrogen forms of these monomers can be readily prepared by reacting the N(dialkyl amino alkyl) acrylamides or methacrylamides with conventional quaternizing agents known to those skilled in the art, e.g., alkyl halides, dialkyl sulfates, epoxy compounds, etc.

The monomer may be polymerized by a conventional redox catalyst or free-radical polymerization techniques to form homopolymers or copolymers. The free-radical method is the most preferred one for the polymerization of the aforementioned monomers. Polymerization by this method may be effected by contacting the monomer or monomers with a polymerization initiator such as benzoyl peroxide, t-butyl hydroperoxide, acetyl peroxide or any other suitable initiator. Homo and copolymers with water-soluble monomers can be prepared by solution polymerization in water, while emulsion and suspension techniques can be employed in accordance with the teachings of U.S. Pat. No. 3,284,393. Among the copolymerizable monomers useful in our invention are acrylic acid, methacrylic acid, the alkali metal, amine and ammonium salts of acrylic and methacrylic acids, methacrylamide, β-aminoethyl acrylate, β-aminoethyl methacrylate, N-methyl-β-aminoethyl acrylate, N-methyl aminoethyl methacrylate, N,N-dimethyl-β-aminoethyl methacrylate, and the water-soluble N-alkyl substituted acrylamide and methacrylamides such as N-isopropyl acrylamide. Still other comonomers of the water-soluble class are the alkali metal vinyl benzoates. Also useful are allyl alcohol, N-vinyl pyridine, N-vinyl pyrrolidone, and N-vinyl-2-oxazolidone.

Water-insoluble monomers such as styrene, methlacrylate, acrylonitrile, butadiene and methyl methacrylate may also be used. The polymers and copolymers useful in the method of this invention should have high molecular weights, preferably of at least 100,000 and more preferably of at least 1,000,000, and should have a solubility in water of at least 0.25 percent. The most preferred polymers include the copolymers formed by reaction of 75 to 99 percent acrylamide and about 1 to 25 percent (3-acrylamido-3-methyl) butyl trimethyl ammonium chloride. However, we may use polymers containing about 1 to 99 percent acrylamide and the balance derived from monomers of formula (I).

In the following table, it will be seen that at a concentration of 0.24 grams per liter in fresh water, very little shear degradation was observed in a very high molecular weight homopolymer of our preferred monomer, poly AMBTAC. In this test, the polymer was added as a solution.

The polymers recited herein should be employed in a fracturing fluid in concentrations of from about 10 to about 1,000 ppm, based on the weight of the fracturing fluid. For other conduits and under other pressure and flow conditions, concentrations of from 1 ppm to 2,500 ppm may be economical. There is no known minimum concentration below which our process is absolutely ineffective.

TABLE 1

| Brookfield[c] Viscosity | Grams Polymer/ Liter Water | Performance of Homopolymer[a] | | | | |
|---|---|---|---|---|---|---|
| | | Water | Initial | Percent Friction Reduction 10 Min. | 20 Min. | Δ S[b] |
| 2080 cps | 0.05 | Fresh | 60.3 | 44.9 | 14.2 | 30.7 |
| 2080 cps | 0.24 | Fresh | 57.7 | 59.0 | 56.2 | 2.8 |
| 1640 cps | 0.12 | Fresh | 56.5 | 48.0 | 26.8 | 21.2 |
| 1640 cps | 0.24 | 2% CaCl₂ | 58.2 | 55.7 | 39.8 | 15.9 |
| 1640 cps | 0.24 | 10% NaCl | 56.5 | 52.8 | 34.5 | 18.3 |

[a]Homopolymer of (3-acrylamido-3-methyl) butyl trimethyl ammonium chloride
[b]Δ S is the loss in friction reduction which results when shear is applied to the solution. Shear was applied at 10 minutes and maintained for 10 minutes.
[c]0.5 percent aqueous solution, spindle No. 2LV, 6 rpm

TABLE 2

| Composition[b] | Performance of Copolymers[a] | | | | |
|---|---|---|---|---|---|
| | Water | Initial | Percent Friction Reduction 10 Min. | 20 Min. | Δ S |
| 80/20 | Fresh | 55.1 | 54.7 | 55.2 | +0.5 |
| 50/50 | Fresh | 51.1 | 51.7 | 47.7 | 4.0 |
| 30/70 | Fresh | 51.9 | 52.0 | 43.1 | 8.9 |

TABLE 2-Continued

| Composition[b] | Performance of Copolymers[a] | | | | |
|---|---|---|---|---|---|
| | Water | Initial | Percent Friction Reduction 10 Min. | 20 Min. | Δ S |
| 80/20 | 2% CaCl₂ | 51.0 | 50.0 | 42.4 | 7.6 |
| 50/50 | 2% CaCl₂ | 48.8 | 48.7 | 34.8 | 13.9 |
| 30/70 | 2% CaCl₂ | 48.4 | 49.5 | 33.4 | 16.1 |

[a]Copolymers of (3-acrylamido-3-methyl) butyl trimethyl ammonium chloride and acrylamide; concentration of copolymer is 0.24 grams per liter for all evolutions
[b]Moles acrylamide/moles (3-acrylamido-3-methyl) butyl trimethyl ammonium chloride copolymer We do not intend to be restricted to the specific examples and illustrations of our invention herein. It may be otherwise practiced within the scope of the following claims.

We claim:

1. An improved method for hydraulically fracturing an earth formation penetrated by a well comprising injecting an aqueous fracturing fluid down the well into the earth formation under pressure to cause fracturing of the earth formation wherein the improvement comprises treating the aqueous fracturing fluid prior to injection with an effective amount of a random, linear, water-soluble polymer consisting essentially of from about 1.0 to 100 percent by weight (3-acrylamido-3-methyl) butyl trimethyl ammonium chloride and from 0 to about 99 weight percent acrylamide.

2. A method of claim 1 wherein the amount of polymer employed is about 10 to 1,000 ppm by weight based on the weight of the aqueous fracturing fluid.

3. A method of claim 2 wherein the polymer has a molecular weight of at least about 1,000,000.

* * * * *